K. M. BYRON.
DRAFT AND STEERING GEAR.
APPLICATION FILED MAY 8, 1918
1,308,476.
Patented July 1, 1919.
2 SHEETS—SHEET 2.
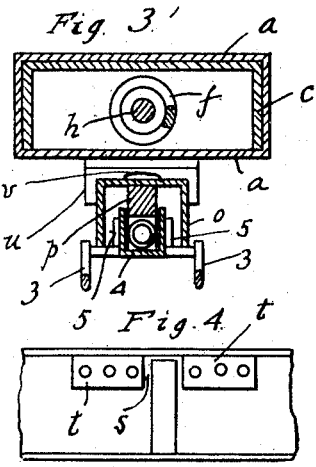
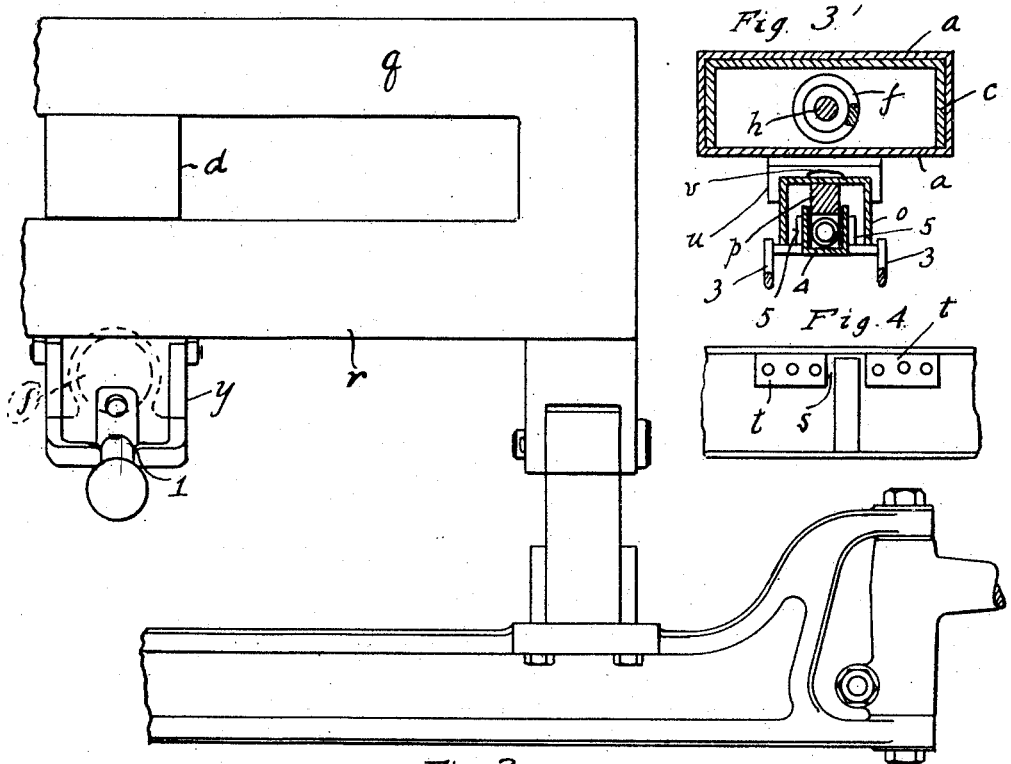
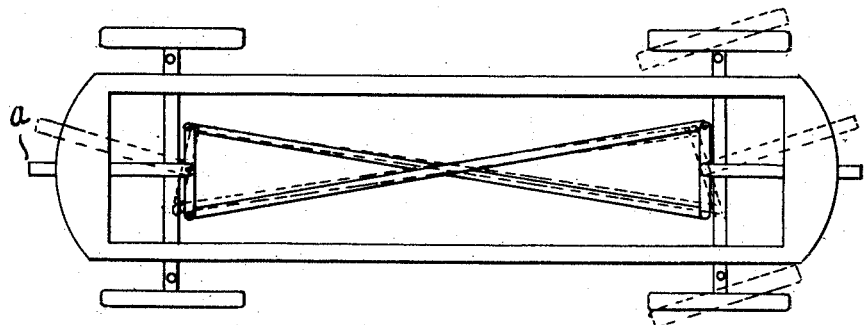

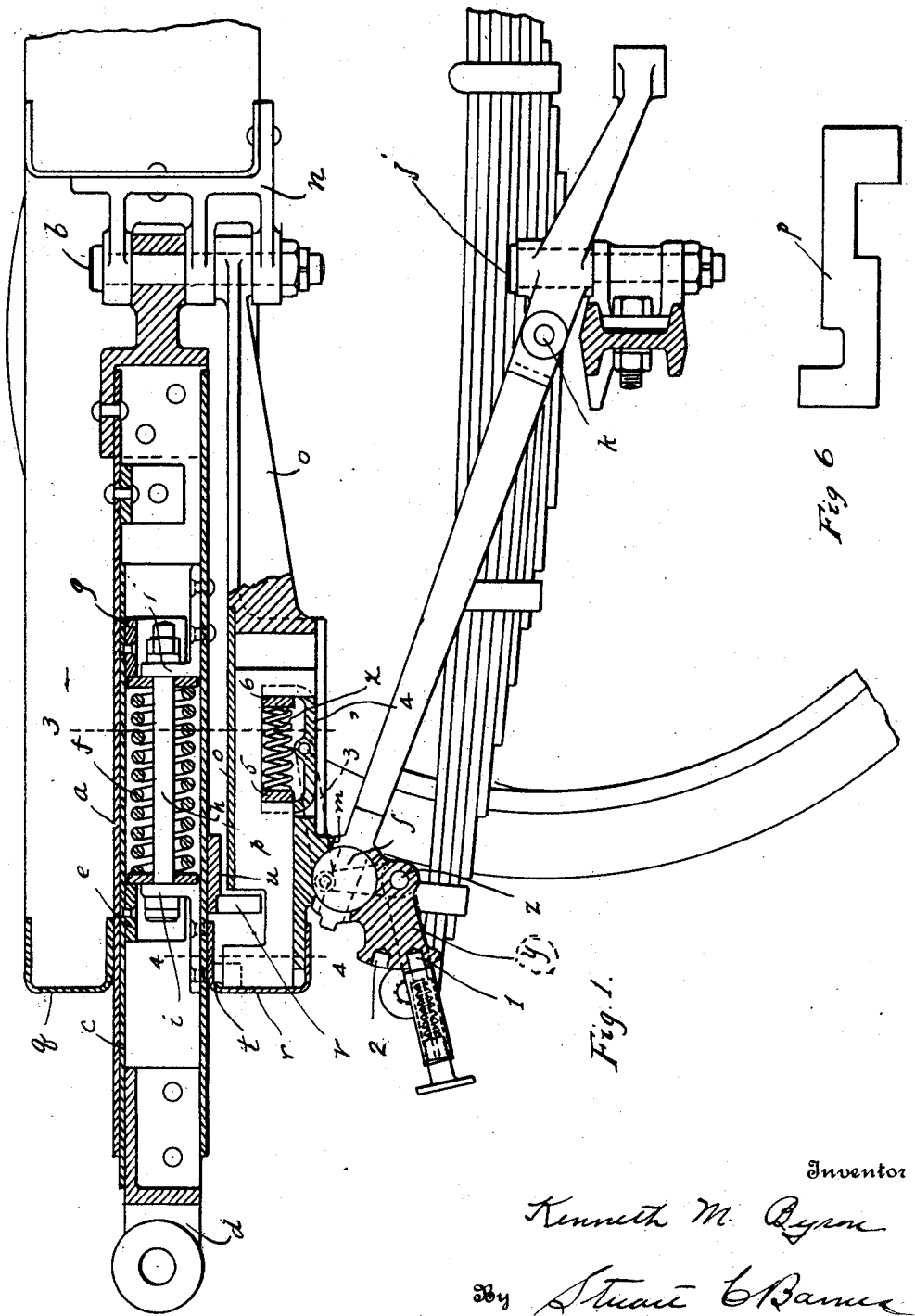

UNITED STATES PATENT OFFICE.

KENNETH M. BYRON, OF DETROIT, MICHIGAN, ASSIGNOR TO ORRA E. BYRON, OF WASHINGTON, DISTRICT OF COLUMBIA.

DRAFT AND STEERING GEAR.

1,308,476.    Specification of Letters Patent.    Patented July 1, 1919.

Application filed May 8, 1918. Serial No. 233,196.

*To all whom it may concern:*

Be it known that I, KENNETH M. BYRON, a citizen of the United States, residing at Detroit, in the county of Wayne and State of Michigan, have invented a new and useful Improvement in Draft and Steering Gears, of which the following is a specification.

This invention relates to the draft and steering gear of a trailer. It has for its object a trailer which is provided with a draw bar and steering arm, the latter of which may be engaged to swing with the draw bar or may be disengaged from the draw bar and locked to hold the wheels in a given position regardless of the swinging of the draw bar.

In the drawings,—

Figure 1 is a vertical section through the front part of a trailer showing the draft and steering gear.

Fig. 2 is a fragmentary front view of the same trailer.

Fig. 3 is a section taken on the line 3—3 of Fig. 1.

Fig. 4 is a view taken on the line 4—4 of Fig. 1.

Fig. 5 is a diagrammatic plan view of a modified form of the trailer showing one of the advantages that follows the use of this construction.

Fig. 6 is a detail of the latch.

The draft gear comprises the draw head $a$ that is pivoted to one of the cross channels at $b$. Within this draw head is a sliding sleeve $c$ to which is riveted the knuckle or eye which carries the coupling head, which is not shown. This sliding sleeve $c$ is provided with a lug $e$ which picks up the double action spring $f$ when the sleeve is driven in by reason of a shock received in the coupling head and is provided with a lug $g$ which picks up the other end of the spring when the sleeve is given a sudden jerk outward. This spring $f$ is coiled about a pin $h$ which is held at either end by an angle iron abutment $i$. Of course this construction is not broadly new and no claim is made for it.

The steering arm is pivoted to the front axle at $j$ and is divided into two portions that are hinged together at $k$ to accommodate the steering gear to the action of the springs. The front end of the steering arm is formed into a ball $l$ which engages in a socket $m$. It is, of course, not new, as already indicated, to connect a draw bar and this steering bar together.

My invention consists in so connecting the draw bar and steering arm together that, (1), the two may be locked to swing together, (2), the steering arm may be locked into a stationary position, allowing the draw bar to swing and, (3), the steering arm may be held free to use to steer. This is accomplished by using the same pivot $b$ and its bracket $n$ to pivotally support a swinging lever $o$ which swings upon the same axis but in a plane below. The front end of this lever is formed into a guide which is hollow, allowing the latch $p$ to slide longitudinally thereof. This latch $p$ is shown in Fig. 6 independent of the housing in which it slides, for clearness. $q$ and $r$ are channel bars at the front of the trailer. The channel bar $r$ has at the center a notch $s$ (see Fig. 4) formed by the spaced abutments $t$, $t$. This serves as a latch recess to lock the steering arm stationary. On the under side of the draw bar is an angle iron $u$ which is notched to form a latch recess $v$. Now obviously when the latch bar $p$ is shifted out of the recess $s$ and into the recess $v$, the lever $o$ together with the steering arm are locked to the draw bar so that the steering arm swings with the draw bar.

It remains to be stated how this latch is shifted. It is shifted by the help of a double action coil spring $x$ which makes the latch automatic, that is to say, when the latch is withdrawn from one recess and it is desired to put it into the other recess and it chances that the latch is not in exact registry with that recess, this spring is compressed by the action of the operator and as soon as the latch is swung to the position where it registers with the recess, the spring expands and automatically forces the latch into its desired recess. This latch is shifted and the spring compressed by moving the bell crank fork $y$ which straddles the socket member of the ball and socket joint and is pivoted thereto at $z$. This fork is provided with a spring latch 1 which enables the bell crank fork to be fixed in either one of two positions, one shown in Fig. 1, which is the lower position, or the upper position which can be easily imagined because of the other recess 2 for the latch 1. In the position shown in Fig. 1 the steering arm is independent of the draw bar for the latch bar $p$ engages in the recess *s*, a part of the chassis of the trailer. Now by pulling out the spring latch 1 and lifting the bell crank fork so that the spring latch 1 will drop into the recess 2, obviously the end of the bell crank lever is shifted backward and forces the links 3 backward. These links are pivoted at their rear ends to the slotted slide 4 which straddles the latch bar *p* (compare Figs. 1 and 3). This slide picks up the spring abutment 5 and consequently compresses the coil spring *x*, if the latch bar does not register with the recess *v* but strikes against the angle bar. Obviously just as soon as the latch bar slides along the angle bar *u* to the recess *v*, the spring will expand and force the latch automatically into the recess locking the steering arm and draw bar together.

The same action is repeated in forcing the bell crank fork down into the lower position except that the slide picks up the spring abutment 6 and compresses the spring against the abutment *t* provided the latch is not ready to slip into the recess *s* in the chassis.

Now referring to Fig. 5, one of the very manifest advantages of this type of control will be evident. The dotted lines in this figure show the steering gear after it has been turned to a different position from the first position shown by the full lines. The draw bar is, when looked at in plan, a T-bar. To the ends of the bar of the T may be connected rods which cross each other to form an X in connecting the opposite ends of the bars of the two T draw bars. Let us assume that the left hand steering arm is locked to the chassis as is the case in Fig. 1, so that the draw bar can swing independently thereof. By connecting up the ends of the cross bar of these T's as shown in Fig. 5, it will be evident that the draw bar at the right or the rear of the vehicle is turned, and as the wheels are shown turning it is evident that the latch is in this case so arranged that the draw bar and the steering arm swing together. The purpose of this is obvious. It allows the steering of the rear wheels in backing and the holding of the front wheels. In short, by this arrangement the rear wheels of the trailer become steerable front wheels and the true front wheels become the stationary rear wheels—precisely the customary way of steering a propelled vehicle. This useful advantage could not be accomplished were it not for the independent or dependent condition that may exist between either of the sets of draw bars and steering arms.

Another marked advantage of having the steering arm independent of the draw bar is that the operator may by holding the fork in neutral position swing the steering arm by hand, guiding the trailer either in going forward or backward.

What I claim is:

1. In a vehicle, the combination of a chassis, an axle, a draw bar pivoted to the chassis, a steering arm pivoted to the axle, and means for optionally locking the draw bar and steering arm together, locking the steering arm free from the draw bar to the chassis, or allowing the steering arm freedom to swing independent of the chassis and the draw bar.

2. In a vehicle, the combination of a chassis, an axle, a draw bar pivoted to the chassis, a steering arm pivoted to the axle, and a latch arranged to engage the draw bar and the steering arm and lock them together, to engage the steering arm and the chassis to lock the steering arm to the chassis and free the steering arm from the draw bar, or to allow the steering arm freedom to swing independently of the chassis and draw bar.

3. In a vehicle, the combination of a chassis provided with a recess for a latch, an axle, a draw bar pivoted to the chassis, a steering arm pivoted to the axle, a member on the draw bar provided with a latch recess, and a latch which is carried by the steering arm and which can be optionally engaged in the recess in the chassis or in the recess connected with the draw bar, or held in neutral position between the two recesses.

4. In a vehicle, the combination of a chassis, an axle, a draw bar pivoted to the chassis, a steering arm pivoted to the axle, a lever pivoted to the chassis and connected to swing with the steering arm, and a sliding latch carried by the forward end of said lever for optionally engaging the draw bar to lock the lever, steering arm and draw bar together, or to engage with the chassis to free the lever and steering arm from the draw bar and lock the same stationary, or occupy a neutral position so that the steering arm and lever may swing free of the chassis and the draw bar.

5. In a vehicle, a chassis, an axle, a draw bar pivoted to the chassis, a steering arm pivoted to the axle, a lever pivoted to the chassis and having a ball and socket connection to the end of the steering arm, and a latch carried by the front end of the lever and adapted to be optionally engaged with the draw bar to lock the same to the steering arm and lever, or to engage the chassis to free the steering arm and lever from the draw bar and lock the steering arm and lever stationary, or occupy a neutral position so that the steering arm and lever may swing free of the chassis and draw bar.

6. In a vehicle, the combination of an axle, a chassis, a draw bar pivoted to the chassis, a steering arm pivoted to the axle, a lever pivoted to the chassis and jointed to the steering arm, the said draw bar being provided with a latch recess, the said chassis being also provided with a latch recess, a latch carried on the front of the said lever and slidable into either one or the other of the recesses, and a slotted slide provided with a coiled spring and straddling the latch and adapted to press against the latch through a coiled spring when the slide is moved in either direction so as to automatically force the latch into the latch recess when registry is secured.

7. In a vehicle, an axle, a chassis, springs for supporting the chassis on the axle, a draw bar pivoted to the chassis, a lever pivoted to the chassis co-axially with the draw bar, a latching arrangement between the lever and the draw bar, and a steering arm pivoted to the axle co-axially with the said lever and the said draw bar.

In witness whereof I have hereunto set my hand on the 2nd day of May, 1918.

KENNETH M. BYRON.